Nov. 28, 1961
A. V. H. CANFIELD
3,010,691
PILOT OPERATED VALVE
Filed Dec. 16, 1959
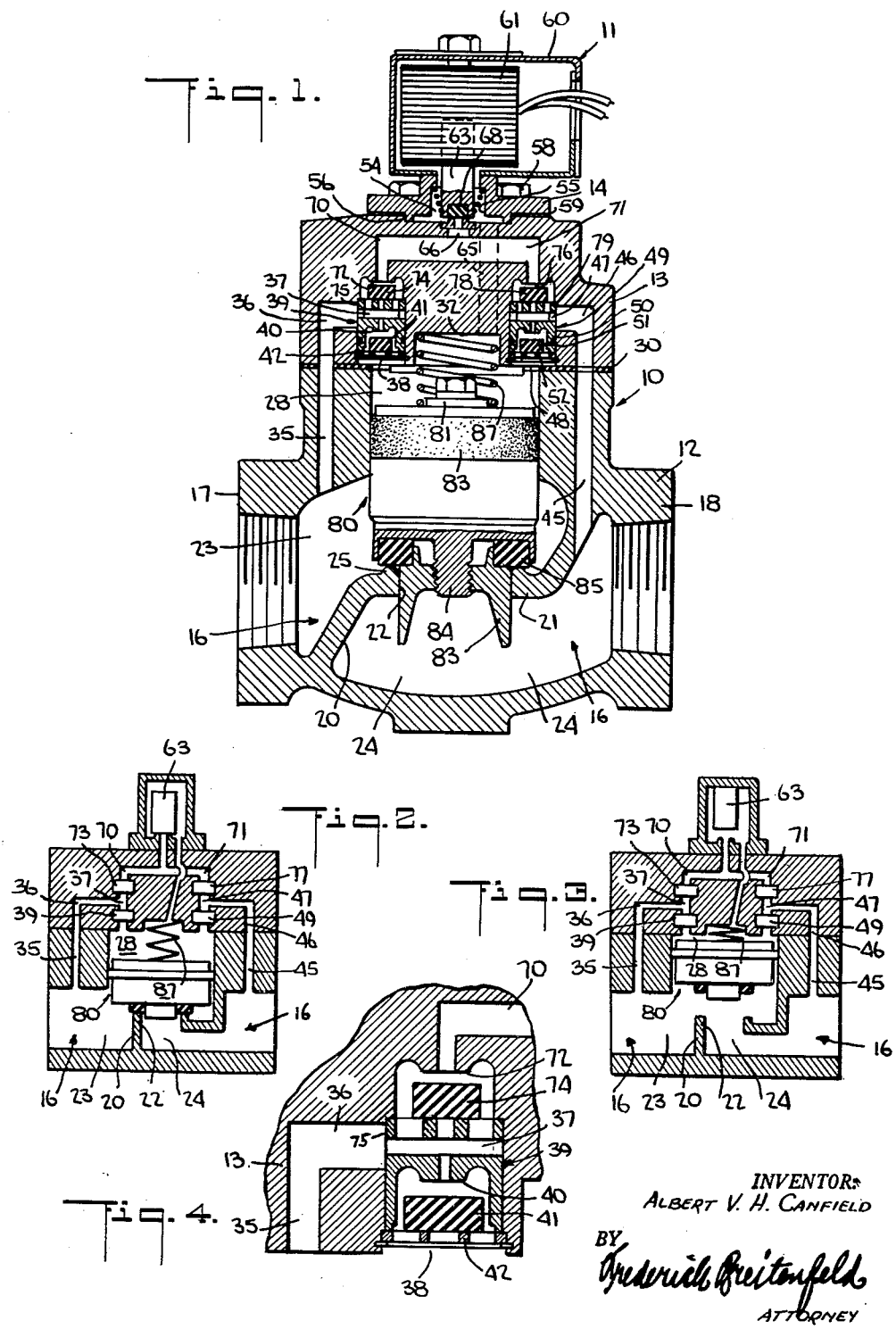
INVENTOR:
ALBERT V. H. CANFIELD
BY
Frederick Breitenfeld
ATTORNEY United States Patent Office 3,010,691
Patented Nov. 28, 1961

3,010,691
PILOT OPERATED VALVE
Albert V. H. Canfield, Cedar Grove, N.J., assignor to Automatic Switch Co., Florham Park, N.J., a corporation of New York
Filed Dec. 16, 1959, Ser. No. 859,921
7 Claims. (Cl. 251—30)

This invention relates generally to valves, and has particular reference to pilot-controlled valves of the type in which an internal piston or equivalent valve element is actuatable by the fluid itself to open or close a port for controlling fluid flow.

Most internal-piston valves are suitable to handle fluid flow in only one direction. It is an object of the invention to provide a valve of improved construction, capable of controlling flow in either direction. Such a valve has a usefulness in hydraulic elevator installations, but the invention is not restricted to this field and may have wider applicability.

A more particular object is to provide a simplified valve structure in which a single 2-way pilot valve is able to control the flow of the fluid through built-in subordinate conduits so as to move a main valve element, such as a piston, to close and open a port through which the main flow of fluid occurs. The construction is of such a character that the valve operates with equal effectiveness and reliability whether the main flow of fluid is in one direction or the other. The pilot valve may be activated electrically, hydraulically, mechanically, or otherwise. A solenoid-operated pilot valve is preferred.

It is another object of the invention to provide a valve in which the response of the main valve element to the movements of the pilot is always sure, and in which the main port is always reliably maintained in either the open or closed condition depending upon the setting dictated by the pilot.

A general objective is to provide a construction having the advantageous characteristics mentioned, which is at the same time simple and durable, entirely reliable, and well suited for commercial manufacture at low cost.

One way of achieving these objects and advantages, and such other advantages as may hereinafter appear, is illustrated in the accompanying drawings, in which—

FIG. 1 is a longitudinal sectional view showing a valve constructed in accordance with the present invention, and illustrating the valve in its closed condition;

FIG. 2 is a schematic sectional view showing the valve of FIG. 1, also in closed condition but with details of construction eliminated for clarity of understanding;

FIG. 3 is a schematic sectional view similar to FIG. 2, showing the valve in its open condition; and FIG. 4 is a fragmentary enlarged view of one of the one-way valve chambers.

The valve illustrated comprises a body 10 which is internally provided with all of the valve structure, except the solenoid-operated pilot valve unit 11 carried externally on the upper end of the valve body 10. In practice, the valve may be formed of separate parts rigidly secured together, including a main body part 12 adapted to be connected in a fluid line, a bonnet 13 superposed on the main body part, and a top plate or cap 14 secured on top of the bonnet and carrying the solenoid 11.

The main body part 12 is provided internally with a through passageway 16 for the main flow of fluid through the valve. The passageway 16 has its opposite ends open and provided with internally threaded connection elements 17 and 18. The passageway 16 is subdivided by a partition 20 which extends more or less diagonally, completely across the passageway, from the outer region adjacent to the part 17 to the inner region adjacent to the part 18. A medial portion 21 of the partition wall 20 is arranged longitudinally with respect to the passageway 16, and is provided with an opening or port 22. The partition 20 subdivides the passageway 16 into fluid chambers 23 and 24, the former being on one side of the partition, the latter on the other. Communication between the chambers 23 and 24 is provided through the port 22 in a direction transverse to the general axis of the passageway 16. Circumscribing the port 22, and provided on the partition 20 on the side which faces inwardly, is an annular bead or ridge 25, defining a valve seat.

Also formed in the main valve body 12 is a cylindrical chamber 28 whose axis is perpendicular to the passageway 16, and which opens into chamber 23 in substantial axial alignment with the port 22. The rear end of the chamber 28 is closed by the bonnet 13. The bonnet 13 is fixedly secured to the body 12 by any suitable means, such as bolts (not shown). A gasket 30 is provided to prevent leakage. The underside of the bonnet 13 may be formed with a recess or cavity 32 facing into the rear part of the cylinder or chamber 28, substantially coaxially therewith.

A relatively small fluid conduit or passageway 35 (see FIG. 4) is formed in the parts 12 and 13. As shown, it extends upward from the chamber 23 through and beyond the upper end of the body 12 to a transverse fluid conduit or passageway 36. The passageway 36 enters into an intermediate region of a subordinate valve chamber 37 which opens through its lower end 38 into the upper end of the cylinder 28. In the lower region of chamber 37 is a one-way valve assembly 39 including a downwardly facing valve seat member 40, and a captive valve element or disc 41 which is freely movable upward into closing relation with the valve seat element 40 or downward to open the latter. A perforated stop element 42 is located to limit downward movement of the valve element 41 and retain it in position to be seated on the seat member 40 by upward fluid pressure.

It will be noted (see especially FIGS. 2 and 3) that the valve chamber 37 is substantially T-shaped, the stem of the T being in communication with the passageway 36, the lower or proximal end of the cross-bar of the T being in direct communication with the rear end of cylinder 28, as shown at 38, and the upper or distal end of the cross-bar of the T communicating with the conduit 70.

A fluid conduit 45, similar to the passageway 35, is formed in the parts 12 and 13 extending upward from the chamber 24. It communicates with a conduit 46 formed in the bonnet 13, leading to a subordinate valve chamber 47 having its lower end region 48 opening downward into the cylindrical chamber 28. In the lower region of the chamber 47 is a one-way check valve 49 similar to the valve 39 in chamber 37, which includes a downwardly facing valve seat 50, a captive valve element 51 freely movable vertically upward into closing relation with the valve seat or downward to open the latter, and a perforated stop or retainer 52 to limit downward opening movement of the valve element 51.

Like valve chamber 37, the valve chamber 47 is substantially T-shaped: the stem communicates with the conduit 46, the lower or proximal end of the cross-bar is in direct communication, at 48, with the rear end of cylinder 28, and the upper or distal end of the cross-bar communicates with the conduit 71.

The conduits 70 and 71 together define a connecting conduit between the distal ends of the valve chambers 37, 47.

Each of the valves 39 and 49 permits fluid flow only in the direction of the cylinder 28, as will be readily understood.

The upper external surface of the bonnet 13 is provided with a shallow recess 54 and the bonnet cap 14 is formed with a downwardly facing cavity 55 bounded by a depending ridge 56 which enters into the recess 54 when the cap seats on the upper end of the bonnet. Thus, the bonnet recess 54 and the cap recess 55 face toward and open into each other to define a common chamber. The cap 14 may be secured on the bonnet 13 by bolts 58 and a gasket 59 is interposed between the bonnet and cap.

Mounted on top of the cap 14 is the pilot valve unit 11, which may include a housing 60 containing a solenoid coil 61. Conductors 62 extend from the coil for connection to a source of electrical supply. A solenoid plunger 63 is mounted in the coil 61 for vertical reciprocation, and in its lowered position it extends downward through the cap 14 into the chamber 54, 55. Vertical movement of the plunger 63 is effected by energization and deenergization of the coil 61.

The bonnet 13 is further formed with an internal fluid conduit 65 extending from its lower end in communication with the upper or rear end of the chamber 28, upward into the recess 54. Extending downward through the bottom wall of the recess 54, in substantial alignment with the plunger 63, is another fluid conduit or passageway 66. An annular seat is formed in the conduit 66 facing upward toward the lower end of the plunger 63; and a valve element 68 is carried on the lower end of the plunger 63 for movement into and out of seating engagement therewith upon vertical reciprocation of the plunger. Thus, the port or conduit 66 may be closed by downward movement of the plunger 63, and opened by upward plunger movement. The passageway consisting of the conduit 65, the pilot valve chamber defined by recesses 54 and 55, and conduit 66 is a "control conduit" which is opened or closed by the pilot valve 63, 68, i.e., by impulses from the solenoid.

The control conduit is larger in effective areas than the passage through either of the one-way valves 39 and 49, so that when the control conduit is opened fluid can escape through it with relative rapidity.

From the passageway 66 extends a pair of divergent branch conduits 70 and 71 leading respectively to the inlet sides of one-way valves 39 and 49. The conduit 70 is a bleed passage which communicates with the upper or distal end of the cross-bar of the T-shaped valve chamber 37, while the conduit 71 is a bleed passage which communicates with the upper or distal end of the cross-bar of the T-shaped valve chamber 47. The opening of the conduit 70 into the chamber 37 is a downwardly facing valve seat 72, forming part of a one-way valve assembly 73 located in the upper region of the chamber 37. A captive valve element 74 is freely movable between the valve seat 72 and a perforated stop disc 75. The disc 75 may be formed as an integral part of the valve assembly 39. The element 74 is movable upward into closing relation with valve seat 72 to prevent flow of fluid from the chamber 37 to branch passageway 70, and is movable away from the valve seat 72 to open the latter and permit fluid flow from passageway 70 to chamber 37. In other words, the one-way valve permits flow only in the direction of the stem of the T. Similarly, a downwardly facing valve seat 76 circumscribes the opening of passageway 71 into chamber 47. It is part of a one-way valve assembly 77 in the upper region of chamber 47 which permits fluid flow only in the direction of the stem of the T, i.e., only from passageway 71 to chamber 47, and not in the reverse direction. The valve assembly 77 includes a freely movable valve element 78 between the valve seat 76 and a perforated retainer 79. The part 79 may be formed as an integral part of the valve assembly 49.

The port openings controlled by valve elements 74, 78, are, like the control conduit, larger in effective area than the passages through either of the one-way valves 39, 49.

By arranging the one-way valves in pairs as hereinbefore described, i.e., so that there is a pair of one-way valves in each of the T-shaped valve chambers 37, 47, and by forming each pair as a single structural assembly, the manufacture and maintenance of the valve as a whole are greatly simplified. Thus, upon separation of the bonnet 13 from the valve body 12, access is readily available to each T-shaped valve chamber 37, 47 and to the assembly of elements in it. As shown most clearly in FIG. 4 each unitary assembly includes a pair of spaced stop elements (42 and 75 in FIG. 4) with one of the valve seats (40) between them. By making the upper stop element and the lower valve seat integral parts of a single supporting element, simplicity and low cost of manufacture and assembly are achieved.

Slidably received within the cylindrical chamber 28 is a main valve element or piston 80. On its rear end is a central boss 81 in alignment with recess 32. A packing ring 83 extends about the piston 80 for sealing engagement with the wall of the chamber 28. On the front end of the piston 80 is a guide sleeve 83 extending downward through the port 22. The guide 83 may be fastened centrally on the front of the piston 80, by threaded connection with the lug 84, and serves to clamp a forwardly facing sealing disc or ring 85 in position on the piston. In the closed condition of FIG. 1, the guide 83 passes through and considerably beyond the port 22, being slidable therein to constrain the piston to axial motion; and the forward surface of the sealing ring 85 seats on the rearwardly or upwardly facing valve seat 25 to effectively close the port 22.

In the rearward region of the chamber 28, on the rear side of the piston 80, there is a resilient element, which may assume the form of a coil compression spring 87. The spring 87 may have its upper or rear end received in the recess 32 of the bonnet 13, seating therein, and have its forward end circumposed about the piston boss 81 in bearing engagement with the rear side of the piston to urge the latter forward.

One of the features of the invention lies in the relative sizes and positional relationship of the valve seat 25 and the valve element 80. The port 22 is smaller in diameter than the piston 80, and is surrounded by an annular space forming part of the fluid chamber 23. As a result, when the piston is in its port-closing position its central region is exposed to the fluid in the chamber 24 while its marginal region is exposed to the fluid in the chamber 23. Since each of these regions, i.e., either the central region or the marginal region, is smaller in effective area than the rear face of the piston within the chamber 28, there is always a pressure differential operating to keep the piston seated on the port 22, when the piston is in its downward port-closing position, regardless of the direction in which the main fluid flow is taking place.

Moreover, because of the reduced area of the port 22 relative to the cross-sectional area of the passageway 16 as a whole, the fluid velocity through the port (when the piston 80 is in its raised position) (FIG. 3) reduces the fluid pressure effective on the front side of the piston (the entire front face being now exposed) and thus induces closing of the port when fluid pressure is applied to the rear side of the valve element 80. The spring 87 enhances this movement.

The operation will be clear upon inspection of FIGS. 2 and 3.

Let it be assumed, first, that fluid is flowing from the left, i.e., that the fluid chamber 23 is connected to the upstream side. Assume also that the pilot valve 63 has closed the control conduit. Under these circumstances the valve element 80 is seated on and closes the port 22, hence the fluid flow through the valve has been stopped (FIG. 2). Also, a part of the upstream fluid will pass through the conduits 35, 36, and through one-way valve 39 into the chamber 28 on the rear side of the piston 80. Since the passageway 66 is closed, and by reason of the one-way orientation of the valve 49, fluid cannot escape from the chamber 28 on the rear side of the piston 80, and therefore exerts forward pressure against the piston. Similarly, the orientation of one-way valve 73 prevents the escape of fluid under pressure through passageway 70. As the effective pressure area of the rear side of the piston 80 is appreciably greater than the effective pressure area on the front side of the piston (exposed to the same fluid) the piston is held forward in its closed condition by the differential pressures. Further, the spring 87 reinforces the closing action of the differential pressures.

If the pilot valve element 63 of the solenoid 11 is now opened, fluid from the chamber 28 on the rear side of the piston 80 will escape through the control conduit and will flow through branch 71, check valve 77, and conduit 46, 45 to the downstream side of the partition 20, thereby releasing pressure from the rear side of the piston. As a result, the effective pressure area on the front side of the piston 80 exposed to the fluid under pressure in the chamber 23 is sufficient to cause rearward or opening movement of the piston against the action of the spring 87. That is, although the pressure on the rear side of the piston 80 is released by opening of the pilot valve element or plunger 63, as hereinbefore described, the pressure on the front side of the valve element 80 is not released, hence sufficient pressure is exerted on the front side of the piston to effect rearward opening movement thereof.

When it is desired to effect forward closing movement of the piston 80 from its open position of FIG. 3, the pilot valve element or plunger 63 is closed, thereby causing pressure to build up in the chamber 28 on the rear side of the piston, as described hereinbefore. As this pressure is static, and hence greater than that of the moving fluid in the main line or passageway 16, and further as the fluid in the main line or passageway 16 must necessarily pass through the restricted opening or constriction provided by the port 22 directly in front of the piston 80, the fluid pressure on the front side of the piston is reduced by the Venturi effect so that a differential pressure exists on opposite sides of the piston in favor of the rear piston side. In addition, the spring 87 adds to the closing action of the differential pressures to insure rapid closing. The parts are thus restored to the condition shown in FIG. 2.

As the entire device is operatively symmetrical or balanced, the foregoing description of operation is equally applicable to fluid flow in the opposite direction.

It should be understood that the description of the preferred form of the invention is for the purpose of complying with Section 112, Title 35 of the U.S. Code and that the appended claims should be construed as broadly as the prior art will permit.

What is claimed is:

1. In a pilot-controlled plural-direction valve having a pair of fluid chambers adapted for connection to external fluid lines, a port between said chambers, a piston chamber, and a reciprocable piston in said piston chamber having its front side facing said port and movable into and out of closing relation with said port: a valve body provided with a pair of T-shaped valve chambers behind the piston, the stems of said T's communicating with said fluid chambers respectively, the cross-bars of said T's having their proximal ends individually in direct communication with the rear side of the piston and their distal ends joined by a connecting conduit, a one-way valve in each of said proximal ends for passing fluid only in the direction of said piston so as to urge it forwardly to its port closing position, another one-way valve in each of said distal ends for passing fluid only in the direction of the stem of the T, a control conduit leading from the rear side of the piston to said connecting conduit, and pilot means for selectively opening and closing said control conduit.

2. A valve body as defined in claim 1, in which the pair of one-way valves in each T constitute parts of a single structural assembly.

3. A valve body as defined in claim 1, in which each one-way valve comprises a valve seat, a valve element movable toward and away from it, and a stop element to limit the valve element's movement, the pair of one-way valves in each of said T-shaped valve chambers being parts of a unitary assembly.

4. A valve body as defined in claim 3, said unitary assembly comprising a pair of said stop elements in spaced relation with one of said valve seats between them.

5. A valve body as defined in claim 4, said unitary assembly including a single supporting element shaped to define the stop element of one valve element and the valve seat of the other.

6. A valve body as defined in claim 1 wherein said pilot means includes a pilot chamber having two ports, one of said ports communicating with the rear side of the piston and the other communicating with said connecting conduit, and a two-position pilot valve so arranged that one of said ports is closed when the valve is in one of its positions and both of said ports are open and communicating with each other when the valve is in the other of its positions.

7. A valve as defined in claim 6 including a solenoid for moving said pilot valve between its two positions.

References Cited in the file of this patent

UNITED STATES PATENTS

| 570,727 | Gale | Nov. 3, 1896 |
| 2,480,712 | Carbon | Aug. 30, 1949 |
| 2,925,984 | Kowalski | Feb. 23, 1960 |